United States Patent [19]

Smithard et al.

[11] Patent Number: 4,906,192
[45] Date of Patent: Mar. 6, 1990

[54] ELECTRONIC COMPUTERIZED SIMULATOR APPARATUS

[76] Inventors: Michael A. Smithard, 21 Lodge Road, Bedhampton, Havant, Hampshire PO9 3LL; John H. Treadwell, 124 White Dirt Lane, Cathering, Hampshire both of England

[21] Appl. No.: 133,918
[22] Filed: Dec. 16, 1987

[30] Foreign Application Priority Data

Dec. 18, 1986 [GB] United Kingdom ............... 8630218
Nov. 12, 1987 [GB] United Kingdom ............... 8726454

[51] Int. Cl.$^4$ ............................................. A63B 69/18
[52] U.S. Cl. ................................. 434/253; 272/97; 434/60
[58] Field of Search ................... 434/253, 60; 273/DIG. 28; 272/97; 73/862.68, 172, 178 R, 774, 862.65; 338/2, 99, 114; 340/365

[56] References Cited

U.S. PATENT DOCUMENTS

| 2,375,178 | 5/1945 | Ruben | 338/99 |
|---|---|---|---|
| 3,629,774 | 12/1971 | Crites | 338/99 |
| 3,791,645 | 2/1974 | Stelma | 434/253 |
| 4,208,648 | 6/1980 | Naumann | 338/99 |
| 4,279,188 | 7/1981 | Scott | 338/99 |
| 4,322,983 | 4/1982 | Sado | 73/862.68 |
| 4,396,189 | 8/1983 | Jenkins | 434/253 |
| 4,503,416 | 3/1985 | Kim | 338/99 |
| 4,516,110 | 5/1985 | Overmyer | 434/253 |
| 4,629,181 | 12/1986 | Krive | 272/146 |
| 4,660,828 | 4/1987 | Weiss | 273/DIG. 28 |
| 4,709,917 | 12/1987 | Yang | 273/DIG. 28 |

FOREIGN PATENT DOCUMENTS

| 2204078 | 8/1973 | Fed. Rep. of Germany | 272/97 |
|---|---|---|---|
| 2822343 | 11/1979 | Fed. Rep. of Germany | . |
| 3233466 | 3/1984 | Fed. Rep. of Germany | 434/60 |
| 844011 | 8/1981 | U.S.S.R. | 272/97 |
| 1043769 | 9/1966 | United Kingdom | 434/253 |

Primary Examiner—Ira S. Lazarus
Assistant Examiner—Richard R. Cole
Attorney, Agent, or Firm—Sixbey, Friedman, Leedom & Ferguson

[57] ABSTRACT

An educational device particularly for use as a ski trainer comprising a rig consisting of a baseboard on which a person under instruction stands on a pair of skis mounted on sensors arranged on the baseboard, the sensors being responsive to the weight, pressure, or movement of the person to produce output signals therefrom which are converted and computed in a data processing unit to provide a simulated trace of the weight, pressure or movement of the person or a simulated trajectory representing his skiing track on the screen of a visual display unit.

22 Claims, 6 Drawing Sheets

ELECTRONIC COMPUTERIZED SIMULATOR APPARATUS

This invention relates to an educational device and particularly but not exclusively to a ski-training device or simulator which enables the skills and techniques of skiing to be learned and practiced at a location remote from the ski slopes, such as for instance inside a building or at home. The educational device of the present invention may be used for teaching other sports and skills and for training purposes, exercising and for playing various games.

The invention will be particularly described by way of illustration only, with reference to a ski-training educational device. Skiing is a very popular sport, both at recreational and competitive levels. However, many people find it relatively difficult to master some of the techniques, especially the downhill turns. Some of the movements involved in these turns are neither natural, nor instinctive. They involve the need to coordinate several body movements, with precise timing and rhythm, together with a need to maintain balance whilst moving at speed. The required sequence of movements has to be remembered and learned. The fear of falling can hinder the learning process. Some of the turns can only be performed at speed and thus it is difficult for an instructor to maintain close contact with a pupil to explain the movements and it is difficult for the pupil to analyse and practice the turns whilst stationary. Many skiers have only relatively short holiday periods in which to practice their skiing and thus it is more difficult for them to achieve the standard they would like to attain.

A further difficulty for the pupil skier is to see and appreciate how the instructors weight is distributed on his skis. It is therefore difficult for the pupil to mimic the instructor and to form a concept of the movements that he requires to learn.

It is an object of the present invention to provide an educational device such as a ski-trainer which, with the aid of means responsive to the movement of a pupil under instruction, can reproduce by means of a computer, a trace or display on a screen indicative of such movement thereby enabling the skills and techniques of skiing to be taught.

Thus, according to one aspect of the present invention there is provided an educational device comprising a plurality of sensors responsive to the pressure, weight or movements applied thereto by a person under instruction, to provide output signals indicative of the said pressure, weight or movements applied by the said person, and data processing means responsive to said output signals from the sensors and arranged to produce a visual display of the said pressure, weight or movements and simulated trajectory on the screen.

The computer is programmed with software arranged to interpret the output signals and compute a simulated trajectory or track that is visible to the person on the visual display device of the computer. Where the educational device is a ski-trainer, this trajectory represents the track that the skier would make in the snow if he were actually skiing on snow. In this way the skier can for instance execute the body movements associated with turning or stopping and see directly on the screen, in real time, a simulated track which represents the speed of travel and the direction he would be travelling in if he had executed that movement when actually skiing on snow. In this way, the skier has direct biofeedback as to the effect of his skiing movements and is able to steer his track across the screen and between simulated obstacles or slalom poles which are arranged to appear on the screen. With the educational device of the present invention, an instructor can observe at close hand, the technique and stance of a pupil skier under instruction and is able to impart detailed instructions to the pupil and indicate mistakes and suggest improvements in the technique for correcting the pupil's errors.

The computer can be used to provide a programme of phased instructions with various displays on the screen showing, for example, the instantaneous weight distribution on the skis, or particular variables may be plotted as a function of time to show a signature of the pupils skiing style. The computer may be used to analyse a pupils technique and compare his movements with those of an expert, and with such an application, the signature of the expert is pre-recorded and displayed on the screen alongside the signature of the pupil for the comparison analysis to be effected. This enables the pupil to understand for example if his weight is sufficiently far forward or whether he has applied enough weight to the inside edges of his skis.

The various graphic displays are visible to both the pupil and instructor, enable the pupil to understand clearly the various movements required to perform a particular exercise, and provides the pupil with the facility to analyse his movements. An instructor in close proximity could also observe and analyse a pupil's movements merely by watching the displays of weight distribution and signature and can accordingly indicate mistakes and suggest corrections and improvements.

Various skiing manoeuvres or techniques can be selected by the pupil or instructor from the menu via the computer keyboard or other input device. The skiing conditions, slope and degree of difficulty can also be selected from the menu. The pupil can thus practice the movements many times without fear of falling and observe the results displayed. The menu can also be used to pre-select lessons, pre-ski exercises, games and competitions such as racing against other skiers, who could be on other rigs or simulated by the computer. It is not necessary to use ski boots and bindings with the device but these add to the realism.

The ski-trainer may be used to practice other snow sports such as powder skiing, monoskiing, snow surfing and telemark skiing. It can also be used to coach competitive skiers. The ski-trainer may be combined with a video recording of a ski run or the equivalent for other sports, and several rigs may be connected to one computer.

For producing output signals indicative of a person's movements on the rig, a wide variety of force, weight, pressure or movement sensing transducers may be used. In one embodiment of the invention, the sensors used are pressure transducers whose resistance decreases when a force or pressure is applied thereto. In a particular embodiment of the invention a pressure transducer employs a plurality of layers of absorbent material, e.g. paper, impregnated with carbon particles, the impregnated paper layers being sandwiched between a pair of electrodes of electrically conductive material, the arrangement being such that when pressure is applied to compress the impregnated layers, the electrical resistance between the electrodes decreases. There are many types of transducers that convert force or pressure into electrical signals. Many of these are relatively expensive and also require electronic equipment to amplify the signals produced. Transducers whose resistance changes with applied pressure have the advantage of not requiring amplifiers. For instance, using such transducers, a suitable electrical signal is obtained simply by applying a fixed voltage across the transducer in series with a fixed resistance, and by measuring the voltage at the junction of the fixed and variable resistances. Carbon or graphite particles have been used in the past for such transducers.

The present invention utilises for the sensors thereof the principle of using carbon or graphite particles to form a transducer whose electrical resistance varies with applied force or pressure. By choice of suitable design parameters the range of resistance of the transducer may be selected and the resistance made inversely proportional to the applied pressure or force. When the graphite particles are impregnated in the layers of absorbent paper as described previously, the paper acts as a convenient matrix for the graphite particles and allows a very simple and inexpensive transducer to be produced and applied to a wide range of applications such as a sensor input which can be read directly into a computer fitted with an analogue-to-digital converter, for example as part of a computer game.

However, it has been found that a more suitable matrix material is rubber or elastomer material.

Thus according to a further aspect of the present invention there is provided a pressure transducer employing a matrix material of rubber or elastomer material which contains carbon or metal particles, the matrix being located between conductive plates forming electrodes such that the volume and/or surface resistivity changes with applied force or pressure.

By suitable choice of matrix, particle concentration and dispersion, a convenient pressure sensor is produced whose volume resistance and/or surface resistance changes with applied force or pressure.

The invention will now be described by way of example only with particular reference to the accompanying drawings, wherein.

Referring to FIGS. 1 to 6, a skier 1 is shown standing on a rig 2 which includes sensors 3 (FIG. 3) whose resistance changes when a force or pressure is applied thereto, as previously described. The output of these sensors 3 is fed via cable 4 to a computer 5. The analogue signals are converted to digital signals on a interface board 6 and then fed on to the computer data bus 7.

Figure 1:
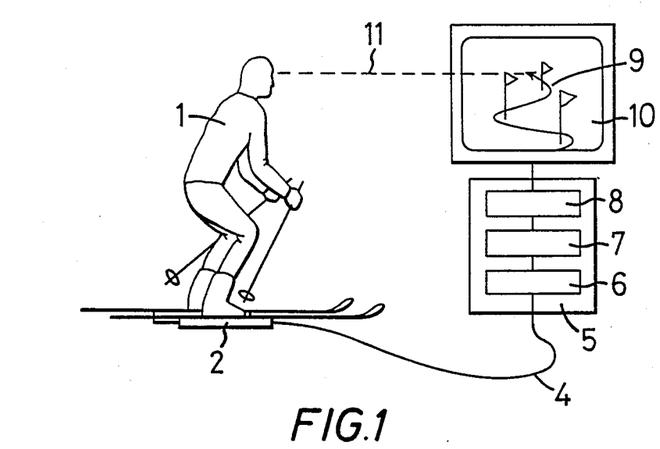
FIG. 1 is a schematic diagram of the educational device of the present invention used as a ski trainer.

The electrical signals which are fed into the computer 5, give a measure of the relative weight or force on the various sensors 3. This data is used to give an indication of how much weight is on the heels relative to the toes, for instance, or how one ski is weighted relative to the other, or how much weight is placed on the edges of the skis.

Figure 2:
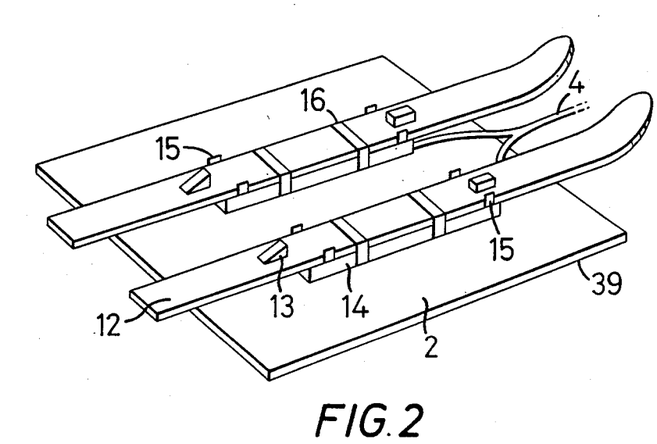
FIG. 2 is a perspective view of an instrumented rig and method of attaching skis thereto.

The computer 5 processes this data using software 8 and computes a simulated trajectory 9 which is displayed on a visual display screen 10. The skier pupil can see the trajectory on the screen 10 and hence, a biofeedback loop 11 is closed and the skier can move his body to steer a route across the screen 10. Referring to FIG. 2, the instrumented rig 2 includes a baseboard 39 and is shown with a normal pair of skis 12 and normal bindings 13 attached to instrumented pads 14 by suitable means such as locating plates 15 and straps or clips 16. The pads 14 contain the sensors 3. The skier wearing ski boots 17 (FIG. 3a) stands on the skis 12 in the normal way attached by the ski bindings 13. Alternatively, normal shoes may be worn with or without the skis and may be attached to the rig with suitable straps. The skier is able to move around on the base 2 which may be covered in a suitable material such as floor carpet or bristle. The skier is able to move one ski relative to the other, change weight from one to the other, edge the skis, and/or lift them from the surface, and apply rotational forces.

The skier is able to adopt the various skiing positions such as snowplough and parallel or downhill racing tuck. As he moves and shifts the weight to turn, the sensors 3 in the pads 14 detect these movements and feed the information into the computer 5 via the cable 4.

Figure 3A:
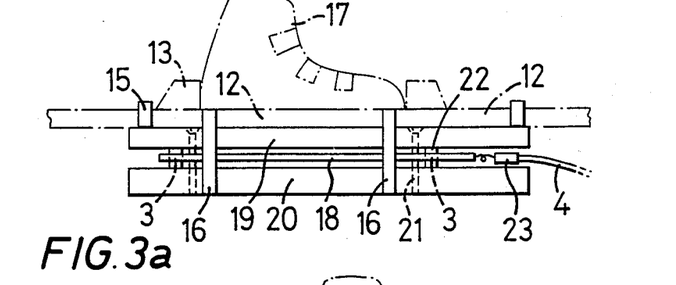
FIGS. 3a, 3b and 3c are side, end and plan views of the pads that form part of the rig of FIG. 2.
Figure 3B:
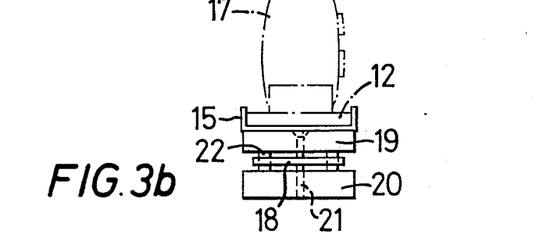
Figure 3C:
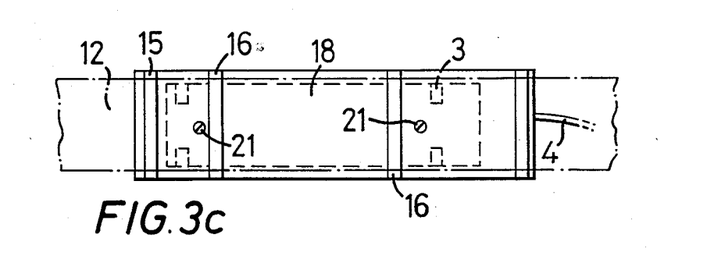

FIGS. 3a, 3b and 3c show the construction of one of the pads 14 used in the rig of FIG. 2. The sensors 3 in the form of a cartridge 18 are sandwiched between upper and lower blocks 19, 20 respectively. The assembly is held together by securing means 21 such as bolts or screws. Compliant pads 22 are mounted on the cartridge 18 so that the skier's weight is transmitted through these pads 22 to the sensors 3. The pads 22 allow some angular flexing and take up dimensional tolerances. The outputs of the sensors 3 are connected by wires to a connector 23 which in turn is connected to the cable 4. Locating plates 15 are fitted to the upper block 19 to accommodate the skis 12. Sidewalls and endwalls (not shown) enclose the sensor cartridge 18 yet still allow some movement between the upper block 19 and the lower block 20 as the compliant pads 22 are compressed. Additional sensors (not shown) may be fitted to detect rotational forces.

Figure 4:
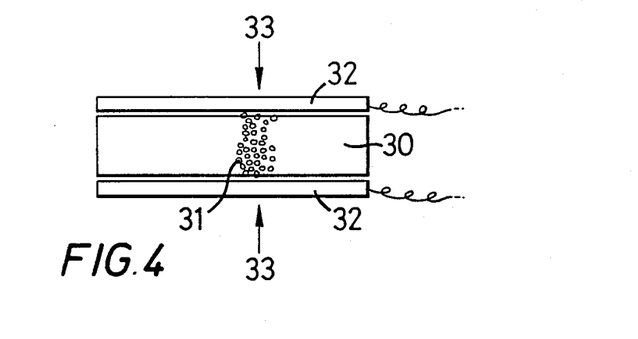
FIG. 4 is a side elevation of a form of transducer for use with the device of the invention.

FIG. 4 shows the principle of operation of the conductive rubber sensors. The sensor material 30 is a composite comprising a matrix material which contains a high concentration of electrically conductive particles 31. Suitable matrix materials include rubber, neoprene, polyethylene, ethyl vinyl acetate or other elastomers or plastics materials. When the composite material is compressed, conduction paths are established and the resistivity of the material decreases. The material is placed between conducting electrodes 32. The electrical resistance between the electrodes will decrease when a compressive force 33 is applied to them. Both the volume resistance and/or the surface resistance between the material and the electrodes are subject to change. The conductive rubber material is produced using conventional rubber or elastomer technology, with appropriate control of composition, dispersion time, particle size and concentration.

Figure 5A:
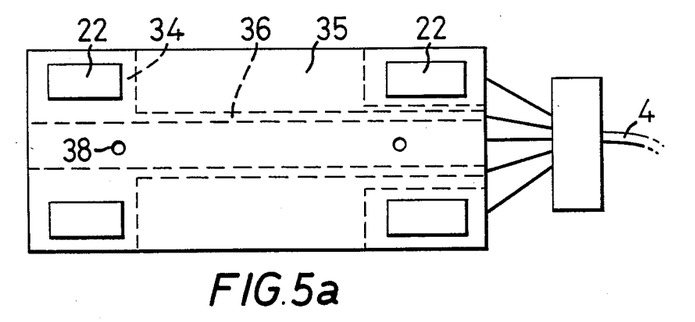
FIGS. 5a and 5b are plan and side views of a sensor cartridge assembly.
Figure 5B:
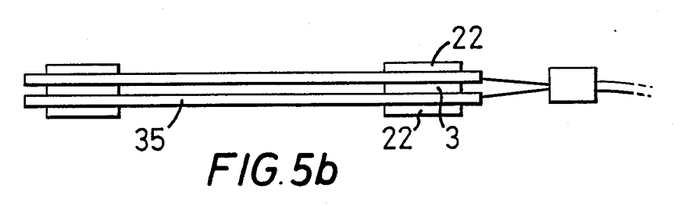

FIGS. 5a and 5b show the construction of a sensor cartridge 18 incorporating four sensors 3. Four electrodes 34 are formed on each of two sheets of printed circuit board material 35 together with the necessary tracks 36 to connect the electrodes 34 to terminals at one end of the sheets. The electrodes 34 and tracks 36 are formed using conventional printed circuit board manufacturing techniques. The four sensors 3 are then mounted between the eight electrodes 34 to form a cartridge of four sensors. Holes 38 are provided in the boards to accommodate screws or bolts 21. Eight compliant pads 22 are mounted, four on each side of the cartridge as shown in FIG. 5b.

Figure 6:
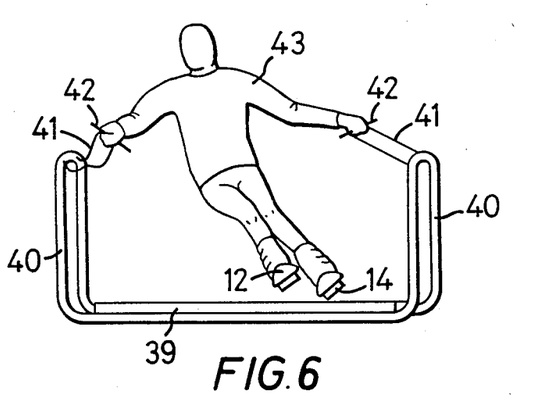
FIG. 6 is a diagrammatic illustration of the manner in which the handles are used to simulate turning movements.

FIG. 6 shows how handles can be incorporated into the rig 2. A baseboard 39 of the rig is fitted on to a rigid frame 40. Handles 42 are attached to the frame 40 by adjustable ropes 41 or similar means. The skier 43 stand on the baseboard 39 using his skis 12 with the instrumented pads 14 attached. By leaning away from, and pulling on one of the handles 42, the effect of centrifugal force associated with turning is simulated. This enables the skier to adopt a realistic dynamic skiing position even while actually stationary. For example, he can simulate a slalom turn by leaning into the turn and putting all his weight on the front inside edge of the outer ski.

Figure 7:
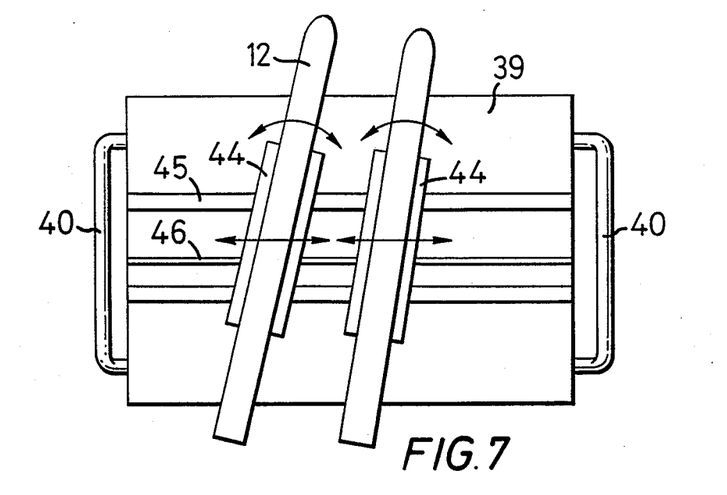
FIG. 7 is a plan view of a rig showing how the skis are arranged to slide, rotate and tilt.

FIG. 7 shows how a rig 2 can be fitted with mechanical arrangements that enable the skier to slide the skis from side-to-side and rotate them and tilt them. This facility can be used if required to provide extra realism and exercise whilst using the simulator. The skis 12 are individually mounted on sliding platforms 44 which are themselves mounted on rails or runners 45 on the baseboard 39. Return springs 46 are provided as shown to restore the platforms 44 to their original positions after use.

Figure 8:
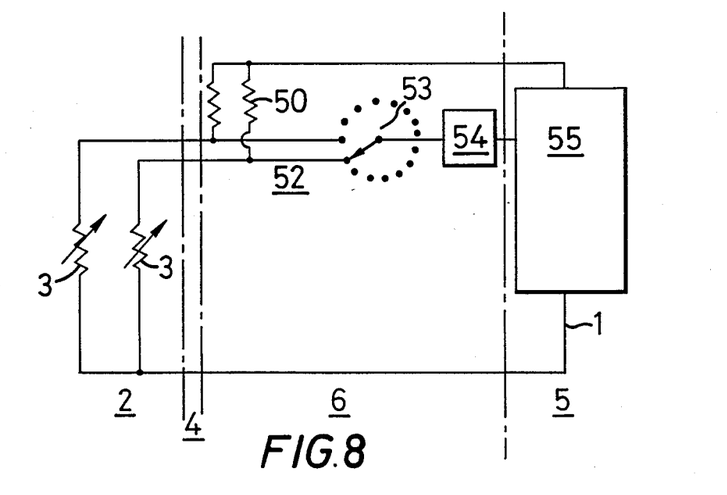
FIG. 8 is a circuit diagram illustrating how the sensors can be interfaced with a computer.

Referring to the diagram shown in FIG. 8, the weight or force sensors 3, are effectively resistors whose resistance varies with the applied weight, pressure or force.

Each sensor 3 shown as a variable resistor, is connected in series with a fixed resistor 50 mounted on an interface board 6 which is associated with the computer 5. A fixed voltage from source 51 (e.g. the +5 volt supply normally available from a computer which is used to drive the integrated circuits) is applied across the fixed and variable resistors 50 and 3 respectively. The voltage at the junction 52 is then a measure of the resistance of sensor 3 and is therefore a measure of the force or pressure applied to the sensor 3. This is the voltage signal that is fed to the computer 5. There is one such voltage signal for each sensor 3. These signals are fed via a multiplexer 53 and an analogue-to-digital converter 54 (which are both on the interface board 6) to the computer data bus 55.

The physical arrangement is also indicated in FIG. 8. The sensors 3 are located on the rig 2, the outputs pass via the cable 4 to the interface board 6 (this is a standard interface board for the particular computer used but with the resistors 50 added). The interface board 6 is physically slotted into the computer 5 so that it effectively becomes part of the computer which receives the output signals and using software, interprets the data to compute the weight or force applied to each sensor 3. The traces are displayed on the screen of a visual display unit. The skier pupil can use the display to ascertain whether he has weight on the inside or outside edges of the skis and when his weight is forwards or backwards and when it is more on one ski than the other. In this way, he can improve his posture and technique and practice the sequences of weight shifting and edge setting that are fundamental to good skiing technique.

Using the algorithms in the software, the computer calculates the effectiveness of manoeuvres executed by the skier pupil, and displays the results as a real time simulation of the skier's trajectory down a slope.

By way of example, the software appropriate to the "snowplough" manoeuvres, contains algorithms such that the skier's trajectory slows down if the skier puts sufficient weight on both skis, and the trajectory turns if more weight is put on one ski than the other. Other algorithms simulate parallel skiing and "off-piste" or "powder" skiing.

Figure 9A:
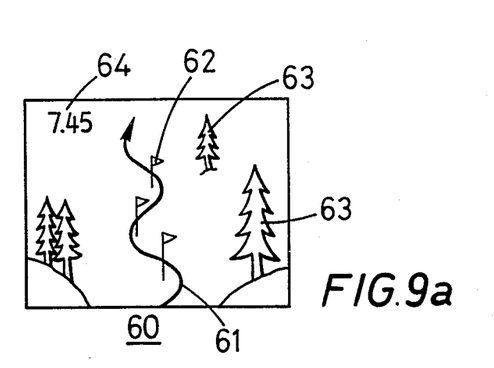
FIGS. 9a, 9b and 9c are typical traces displayed on the visual display screen of the computer and visible to a pupil under instruction.
Figure 9B:
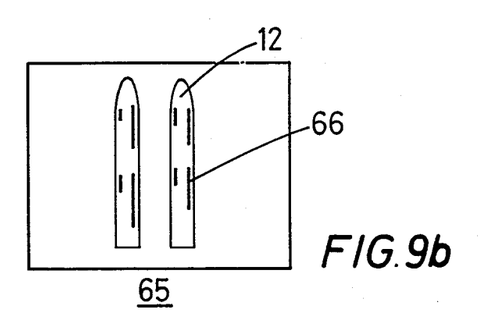
Figure 9C:
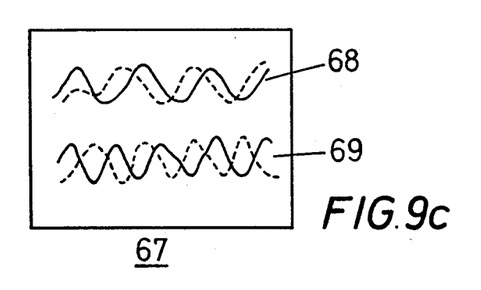

FIGS. 9a, 9b and 9c show by way of example some typical displays that the pupil would see on the screen. The first display 60 shows the skier's track 61 down a course marked by slalom poles 62 and obstacle 63. A clock 64 indicates the elapsed time on the course. The screen can be scrolled to make a realistic simulation of a downhill run. The display could include the topology of the run including moguls. If required, the computer 5 is arranged to emit an audible tone that varies with speed. If the skier hits an obstacle, steers off the screen or makes an erroneous movement, then the run can end in a simulated fall with accompanying error message. The display 65 shown in FIG. 9b shows the skier's weight distribution on the skis. The length of the bars 66 indicates the amount of weight on the corresponding part of the ski 12. This can be used to correct posture and also to learn the sequence of weight shifts that are an essential part of all skiing manoeuvres. The third display 67 in FIG. 9c shows a visual plot against the base of time of selected parameters of a skier's movements. These constitute a skier's signature which can be used to analyse and improve the skier's technique. In display 67, the skier pupil's signature is shown by trace 68 whilst a pre-recorded expert's signature 69 is shown below for comparison purposes.

Figure 10:
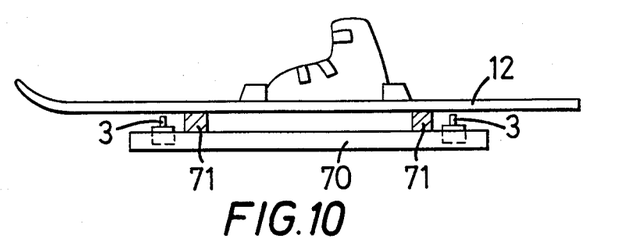
FIG. 10 is a side elevation illustrating how the sensors can be attached to the skis.

A further embodiment of the invention is shown in FIG. 10 wherein the sensors 3 are incorporated in a base plate or pad 70 on to which the skis 12 attach. The sensors are preferably linear movement transducers used in conjunction with springs or compliant pads 71 of suitable material. As weight is applied, the springs or pads 71 compress and the movement is detected by the linear movement transducers 3 to produce signals indicative thereof.

Figure 11:
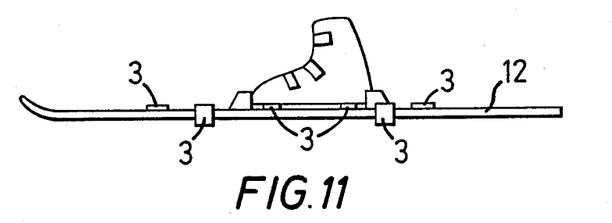
FIG. 11 is a side elevation of an embodiment in which the sensors are arranged to clip on to the skis.

FIG. 11 illustrates a still further embodiment of the invention in which the sensors 3 are individually or in pairs clipped or otherwise secured directly to the skis 12 or under the ski boots 17 without the need for pads or plates as shown in FIG. 10. In this embodiment the sensors 3 may be strain gauges attached to the upper surface of each ski 12, as shown.

Figure 12:
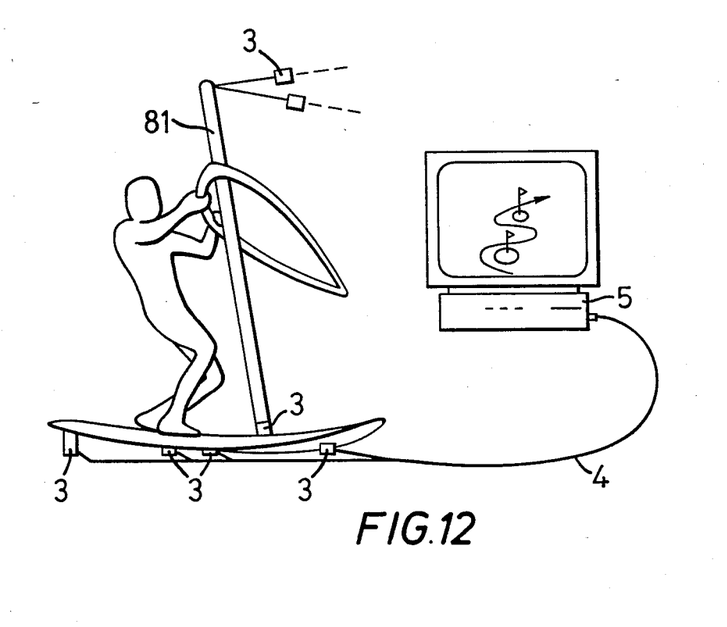
FIG. 12 is a diagrammatic illustration showing how the educational device of the present invention is applied to the teaching of windsurfing techniques.

Although the invention has been particularly described with reference to a ski trainer, the invention may be used to teach other sports and in FIG. 12, there is shown an educational device for teaching the techniques of windsurfing. In the windsurfing simulator shown, a real or simulated board 80 is fitted with a plurality of sensors 3 which detect how the occupant's weight is distributed, i.e. whether it is located mainly at the bow or stern or on the portside or starboard side. The sensors 3 also measure the force on the sail or wishbone or mast or on the bottom of the mast 81. The windsurfer simulator may be configured to use the same or similar computer as for the ski trainer, but with different software and hence different visual presentation on the screen. The simulator may include the effect of waves and surf as well as wind, and can be used to teach a wide variety of manoeuvres including correct stance for optimum speed and turns such as the carve gybe.

It will be appreciated that the invention is capable of considerable modification and is not to be deemed limited to the particular constructional features illustrated, and although the invention has been particularly described with reference to an educational device for use as a ski trainer or simulator, it will be seen that other sports may be taught such as windsurfing.

Furthermore a wide variety of force, weight, pressure or movement sensors may be employed in the educational device. These may be used to sense the movement of the pupil under instruction and/or the movements of part of the rig and/or the distribution of the weight of the pupil on various parts of the rig. The sensors may be such that their electrical resistance, capacitance or inductance, or magnetic or electromagnetic properties change with applied force, pressure, weight or movement. For example the sensors may be strain gauges or load cells or piezo-electric transducers or linear movement transducers or pressure sensitive resistors. Alternatively, optical sensors or audio sensors may be used. Mechanical, electrical or fluid linkage may be used to convert the movement, force, weight, or pressure either directly or indirectly into the form of electrical signals.

The signals from the sensors are supplied to the computer after or before conversion into a suitable format for the computer to use. The computer may be a general purpose one such as a personal computer, or the computer may be specially modified for the purpose. The display unit may be a normal CRT monitor screen provided with the computer or alternatively, a television screen may be used. A large projected video screen may be used or an LCD flat display, or any computer compatible display may suffice.

We claim:

1. An educational electronic computerized simulator apparatus for visually providing the response of a person performing an activity that utilizes a force distribution applied by the person as a way of controlling the activity including pad means with at least one linear movement sensor responsive to the force applied by a person under instruction to generate output signals indicative of the degree of the force on said sensor by the person, and data processing means responsive to said output signals to generate, with the aid of algorithms, further signals that produce a simulated visual display of said activity on a visual display screen visible to said person under instruction represented as a function of the degree of force applied by the person on said sensor over a period of time and to produce a visual indication of an optimum performance of the activity represented as a function of the degree of force over the same time period so as to provide a visual indication to the person how closely his/her performance has approached the optimum performance. Wherein said data processing means includes algorithms that compute from the signals obtained from the at least one sensor, factors relating to the force, weight or movement applied by the person under instruction to different parts of the pad means and, that compute signals for the production of a visual display showing the variation of at least the said factors as a function of time such as to constitute a signature or visible indication of the person's ability to perform the particular activity which is used to assess the person's ability and to be compared with a signature of a reference performance.

2. Apparatus as claimed in claim 1, wherein said pad means includes a plurality of sensors that each provide output signals representative of the force or movement applied thereto, and said data processing means includes multiplexing means to multiplex the output signals from the sensors and means for converting in real time analog signals from said sensors to digital signals and said data processing means including algorithms which represent a simulated environment appropriate to a particular activity undertaken by said person, and further algorithms arranged to compute from the digital signals and from the simulated environment the consequences of the actions of the person, and said data processing means including further means to display said consequences on the visual display device.

3. Apparatus as claimed in claim 2, including further algorithms arranged to cause the display to move or be animated to increase the realism of the simulation.

4. Apparatus as claimed in claim 2 wherein each of said sensors comprise a cartridge sandwiched between upper and lower blocks, compliant pads being mounted on the cartridge such that the weight of said person is transmitted through the pads to the sensors and the compliant pads allow some measurement of the upper block relative to the lower block.

5. Apparatus as claimed in claim 4, wherein a cartridge incorporates a plurality of sensors and includes a number of electrodes corresponding to twice the number of sensors and formed on each of two sheets of printed circuit board material together with associated tracks to connect the electrodes to terminals located on said sheets, the sensors being mounted between the electrodes to form the cartridge assembly, and the assembly being located between a number of compliant pads corresponding in number to the number of electrodes of the cartridge.

6. Apparatus as claimed in claim 2, wherein the baseboard of the rig is secured to a rigid frame, a pair of handles being arranged on either side of the frame and arranged to be gripped by the person under instruction and standing on the rig, said person by leaning away from and pulling on one or the other of the handles simulating the effect of the centrifugal force associated with turning movements to provide a corresponding trace on the screen as the weight or pressure of the person is applied to the sensors of the rig.

7. Apparatus as claimed in claim 2, wherein said skis are individually mounted on platforms which are themselves mounted on rails or runners on the baseboard such that the platforms and skis are slidable transversely on the rig, thereby allowing the rig to simulate rotational and tilting movements.

8. Apparatus as claimed in claim 1 and for use as a ski trainer comprising an instrumented rig including ski means representing a pair of skis and on which the person under instruction is arranged to stand, said pad means including a plurality of pads containing said sensors and associated with said means representing the skis, each pad comprising an upper and a lower block with a sensor sandwiched therebetween so as to be responsive to the force exerted by the person under instruction on specific parts of the ski means beneath the skier's feet and responsive to changes in the force exerted as a function of time.

9. Apparatus as claimed in claim 8 wherein said data processing means includes algorithms that
   (a) compute from the signals obtained from the at least one sensor, factors relating to the force, weight or movement applied by the person under instruction to different parts of the ski means,
   (b) compute from the said factors and algorthms that simulate the environment and the speed and direction and changes in the speed and direction that said person would experience if the movements were executed by said person under the simulated conditions using the particular style and technique being taught and for which the algorithms are designed,
   (c) compute signals for the production of a visual display of the simulated trajectory of the skier on said visual display device visible to the skier,
   (d) compute signals for the production of a visual display of the distribution of weight on the sensors,
   (e) compute signals for the production of a visual display showing the variation of at least the said factors as a function of time such as to-constitute a signature or visible indication of the person's skiing ability which is used to assess the skier's ability and to be compared with a signature of an expert.

10. An educational electronic computerized simulator apparatus arranged to provide visual indications of the response of a person when attempting to perform particular activities utilizing a force distribution applied by the person as a way of controlling the activity, such as skiing, said apparatus including pad means with at least one pressure sensor responsive to the force, e.g., pressure, weight, applied thereto by said person for determining the degree of the force on the pressure sensor to indicate the distribution of the force on the pad means as applied by the person when attempting to perform a particular activity, such as a downhill turn, to produce output signals indicative of such an attempt, and data processing means responsive to said output signals from said at least one pressure sensor to convert with the aid of algorithms said signals into a simulated indication on a visual display device visible to said person, of his performance and the extent to which the person has succeeded in performing the particular activity, the simulated indication on said visual display device represented as a function of the degree of force applied by the person on said pressure sensor over a period of time, wherein said data processing means includes algorithms that compute from the signals obtained from the at least one sensor, factors relating to the force, weight or movement applied by the person under instruction to different parts of the pad means and, that compute signals for the production of a visual display showing the variation of at least the said factors as a function of time such as to constitute a signature or visible indication of the person's ability to perform the particular activity which is used to assess the person's ability and to be compared with a signature of a reference performance.

11. The apparatus as claimed in claim 10, wherein said data processing means further produces a visual representation of a reference performance as a function of the degree of force over the same period of time so that the person can visually compare his/her performance with that of the reference performance for instructional purposes.

12. Apparatus as claimed in claim 10, wherein said pad means includes a plurality of sensors that each provide output signals representative of the force or movement applied thereto, and said data processing means includes multiplexing means to multiplex the output signals from the sensors and means for converting in real time analog signals from said sensors to digital signals and said data processing means including algorithms which represent a simulated environment appropriate to a particular activity undertaken by said person, and further algorithms arranged to compute from the digital signals and from the simulated environment the consequences of the actions of the person, and said data processing means including further means to display said consequences on the visual display device.

13. Apparatus as claimed in claim 12, including further algorithms arranged to cause the display to move or be animated to increase the realism of the simulation.

14. Apparatus as claimed in claim 12 wherein each of said sensors comprise a cartridge sandwiched between upper and lower blocks, compliant pads being mounted on the cartridge such that the weight of said person is transmitted through the pads to the sensors and the compliant pads allow some measurement of the upper block relative to the lower block.

15. Apparatus as claimed in claim 14, wherein a cartridge incorporates a plurality of sensors and includes a number of electrodes corresponding to twice the number of sensors and formed on each of two sheets of printed circuit board material together with associated tracks to connect the electrodes to terminals located on said sheets, the sensors being mounted between the electrodes to form the cartridge assembly, and the assembly being located between a number of compliant pads corresponding in number to the number of electrodes of the cartridge.

16. Apparatus as claimed in claim 12, wherein the baseboard of the rig is secured to a rigid frame, a pair of handles being arranged on either side of the frame and arranged to be gripped by the person under instruction and standing on the rig, said person by leaning away from and pulling on one or the other of the handles simulating the effect of the centrifugal force associated with turning movements to provide a corresponding trace on the screen as the weight or pressure of the person is applied to the sensors of the rig.

17. Apparatus as claimed in claim 12, wherein said skis are individually mounted on platforms which are themselves mounted on rails or runners on the baseboard such that the platforms and skis are slidable transversely on the rig, thereby allowing the rig to simulate rotational and tilting movements.

18. Apparatus as claimed in claim 10 and for use as a ski trainer comprising an instrumented rig including ski means representing a pair of skis and on which the person under instruction is arranged to stand, said pad means including a plurality of pads containing said sensors and associated with said means representing the skis, each pad comprising an upper and a lower block with a sensor sandwiched therebetween so as to be responsive to the force exerted by the person under instruction on specific parts of the ski means beneath the skier's feet and responsive to changes in the force exerted as a function of time.

19. Apparatus as claimed in claim 18 wherein said data processing means includes algorithms that
  (a) compute from the signals obtained from the at least one sensor, factors relating to the force, weight or movement applied by the person under instruction to different parts of the ski means,
  (b) compute from the said factors and algorthms that simulate the environment and the speed and direction and changes in the speed and direction that said person would experience if the movements were executed by said person under the simulated conditions using the particular style and technique being taught and for which the algorithms are designed,
  (c) compute signals for the production of a visual display of the simulated trajectory of the skier on said visual display device visible to the skier,
  (d) compute signals for the production of a visual display of the distribution of weight on the sensors,
  (e) compute signals for the production of a visual display showing the variation of at least the said factors as a function of time such as to constitute a signature or visible indication of the person's skiing ability which is used to assess the skier's ability and to be compared with a signature of an expert.

20. Apparatus as claimed in claim 10, wherein said at least one sensor comprises a pressure transducer whose electrical resistance changes with applied force and which is connected to a voltage source such as to produce a voltage signal which is a measure of the force or pressure applied to the sensor, the signals from a plurality of said sensors being multiplexed and applied via an analog-to-digital converter to a data bus of said data processing means.

21. Apparatus as claimed in claim 10 and for use as a windsurfing trainer including a board or simulated board fitted with a plurality of sensors responsive to the weight distribution of a person under instruction, said sensors being mounted on the mast or wishbone and measuring the force exerted by said person on various parts of the board and mast or wishbone, and said data processing means including algorithms from which the simulated direction speed and trajectory are computed in response to movement or force exerted by said person, said algorithms providing simulated wind and wave conditions to modify the speed and trajectory visually displayed on said visual display device.

22. Apparatus as claimed in claim 10, wherein means are provided for converting analog signals from sensors to digital signals at least some of the sensors comprised of a pressure transducer employing a matrix of electrically insulating material, e.g. rubber or elastomer, containing conductive particles, e.g. carbon or metal, the matrix being located between electrodes such that the electrical resistance between the electrodes decreases when pressure is applied to the matrix, the characteristics of the matrix material and the concentration and type of the conducting particles being chosen such that each value of applied pressure produces a distinct value of resistance and the output resistance decreased in proportion to the increase in pressure applied thereto, with the characteristics of the materials further chosen to produce a range of output resistance suited to the dynamic range of the analog-to-digital converter means.

* * * * *